F. GREENWOOD.
SILO.
APPLICATION FILED APR. 3, 1915.
1,237,202. Patented Aug. 14, 1917.
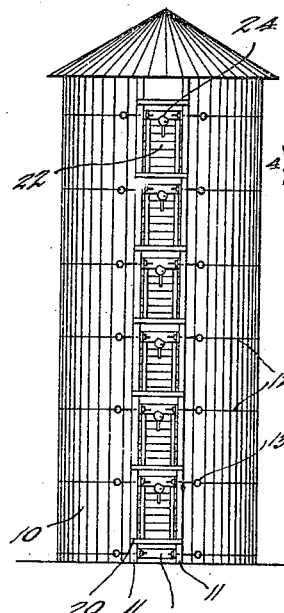
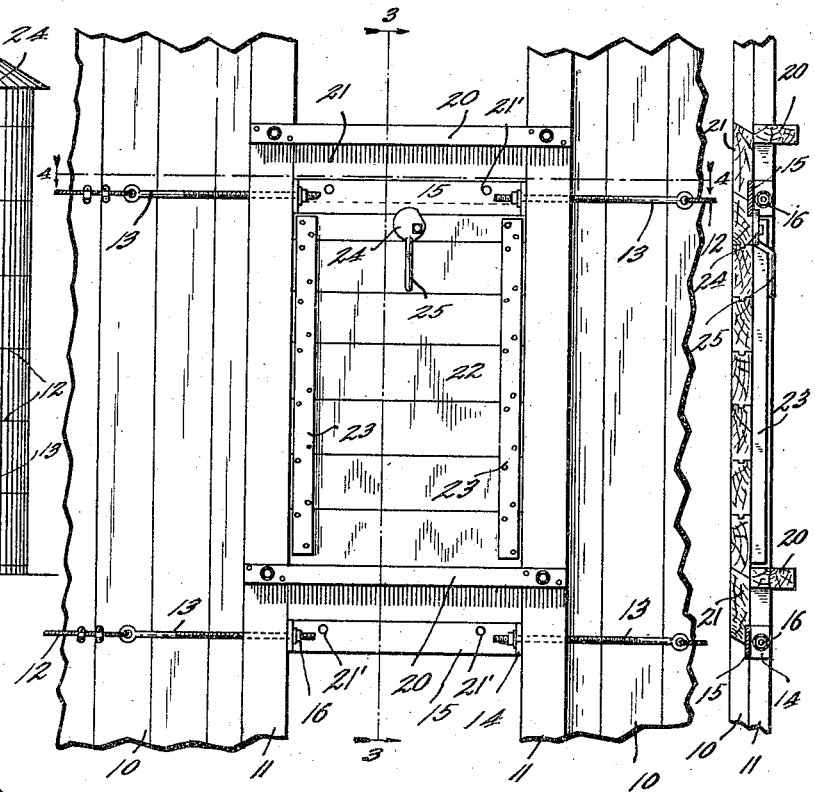
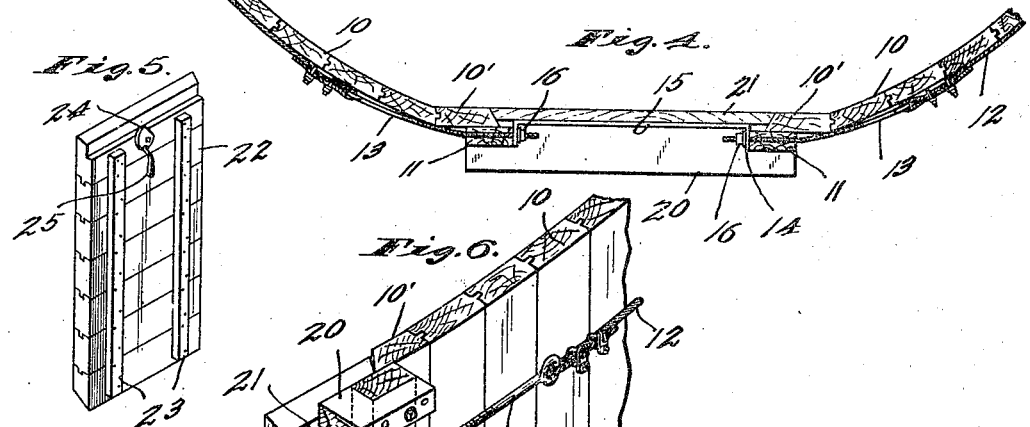
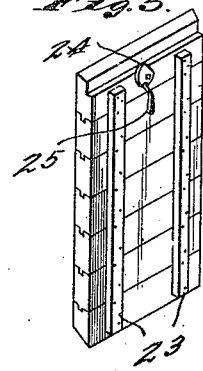
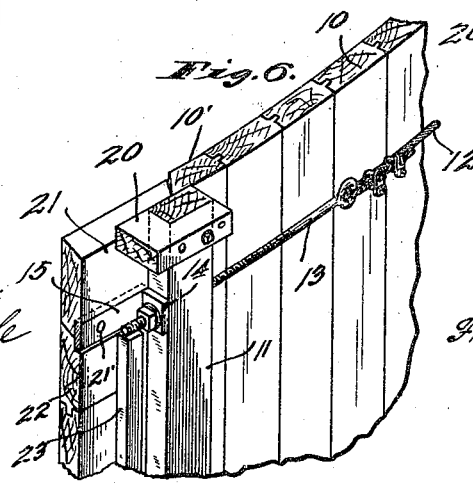
WITNESSES:
INVENTOR
Franklin Greenwood,
BY
ATTORNEYS

UNITED STATES PATENT OFFICE.

FRANKLIN GREENWOOD, OF INDIANAPOLIS, INDIANA.

SILO.

1,237,202.  Specification of Letters Patent.  Patented Aug. 14, 1917.

Application filed April 3, 1915.  Serial No. 18,873.

*To all whom it may concern:*

Be it known that I, FRANKLIN GREENWOOD, a citizen of the United States, residing at Indianapolis, in the county of Marion and State of Indiana, have invented a new and useful Silo, of which the following is a specification.

It is the object of my invention to provide a stave silo in which the inwardly directed pressure of the hoops may be more evenly distributed, the tendency for the door jambs to push together is in large part if not completely eliminated, and the removable doors are more firmly and yet more easily clamped in place.

In carrying out my invention, I use cables instead of iron rods for the hoops; and instead of passing these hoops continuously around the silo and across the space between the door jambs I pass them from one side of the door opening around the silo to the other side thereof and attach the ends of these hoops, as by eye bolts, to a doorway-spanning member which bears against the adjacent edges of the door jambs. These doorway-spanning members are preferably flat bars with flanged ends which bear against the door jamb edges, and the removable doors are preferably recessed to receive these iron bars and are provided with locking members which coöperate with said iron bars to hold the doors in place.

The accompanying drawing illustrates my invention. Figure 1 is a front elevation of a silo embodying my invention; Fig. 2 is a front elevation of a fragment of the silo, including part of the series of doorways, one door in place, and parts of two of the hoops; Fig. 3 is a section on the line 3—3 of Fig. 2; Fig. 4 is a section on the line 4—4 of Fig. 2; Fig. 5 is a perspective view of one of the doors; and Fig. 6 is a fragmentary perspective sectional view showing the relationship of the staves, the door, a jamb, a hoop, an eye bolt, and a doorway-spanning member.

The silo is built mainly of vertical staves 10, which are preferably tongued and grooved as shown. The series of staves 10 extend entirely around the silo and form its walls, except for a vertical series of doorway openings, which is left at a convenient point and is of any suitable width. The staves 10' at the edges of the doorways are preferably beveled at their adjacent edges, as is clear from Figs. 4 and 6, so that the opening between them is narrower toward the outside of the silo. Vertical pieces 11 may be firmly fastened to the edge staves 10', conveniently overlapping the opening between the edge staves slightly, as is clear from Fig. 4. The edge staves 10' and the vertical pieces 11 together form the door jambs. The staves 10 are clamped together by hoops 12, which are made of wire cable, as I have found that by using cable instead of iron rods for the hoops the inwardly directed pressure exerted on the staves by the hoops is more evenly distributed around the silo, due to the greater flexibility of the cable, and also because cables are both stronger than solid rods and more resilient under changes in tension. The cable hoops 12 do not extend entirely around the silo, but only extend from one door jamb around the silo to the other door jamb, at the door jambs being provided with eye bolts 13 to the eyes of which the cable ends are suitably attached. These eye bolts extend through holes in the vertical pieces 11 and through holes in flanges 14 of doorway-spanning members 15, and on their ends on the inner sides of the flanges 14 such eye bolts are provided with tightening hoop-adjusting nuts 16. The flanges 14 bear against the adjacent edges of the two vertical pieces 11, and the tension of the hoops is transmitted across the doorway openings by the doorway-spanning members 15, so that as the hoops 12 are tightened by the nuts 16 the flanges 14 hold the vertical pieces 11 apart the proper distance and effectually prevent all strain upon them tending to force them toward each other. The use of cable hoops and the eye bolts at the door openings permits all the tightening of the hoops to be done at the door openings. The doorway-spanning members 15 are preferably made of flat iron, and the flanges 14 are turned outward, so that the bodies of such members 15 lie behind the plane of the vertical members 11. The attachment of the cable ends to the eye bolts allows the slack of the cables to be taken up after the threads on the eyebolts are all used, so that the threads on the eyebolts may be used over again without necessitating removing the hoop and taking it to a shop to cut new threads.

In addition to the doorway-spanning members 15, the doorway openings may be crossed by struts 20, which are rabbeted at their ends to fit upon, and are bolted to, the vertical members 11, as is clear from Fig. 6.

However, these struts are not essential, though they are desirable, as for purposes of erection. If desired, the doorway openings may also be crossed by fixed cross pieces 21, which separate the adjacent doorways of the series and the ends of which are beveled and fit against and are suitably fastened to the edge staves 10′, and preferably are also fastened to the doorway-spanning members 15, as by units 21′, to hold such members 15 straight. If these cross pieces 21 are used, their upper and lower edges are beveled so that both edges have the lowest points toward the outside of the silo. The front faces of the cross pieces 21 are also rabbeted at the bottom to fit over the upper edges of the bodies of the doorway-spanning members 15. The rear faces of the cross pieces 21 are preferably flush with the rear faces of the edge staves 10′.

In the same vertical plane with the cross pieces 21 are a series of removable doors 22, which are conveniently formed of a series of horizontally extending boards fastened together by cleats 23 and are beveled at their upper and lower edges to fit against the lower and upper edges respectively of the adjacent cross pieces 21 above and below, and are beveled at their vertical edges to fit against the correspondingly beveled edges of the edge staves 10′. If the fixed cross pieces 21 are not used, the lower edge of one door fits directly upon the upper edge of the adjacent door below. The front faces of the doors 22 are rabbeted at the top to fit over the lower edges of the bodies of the doorway-spanning members 15. The front face of each door near the top is provided with a cam-shaped locking member 24, having an operating handle 25. This cam-shaped locking member 24 when in locking position with its door in place extends upward onto the front face of the body of the adjacent doorway-spanning member 15, thus locking the upper edge of the door in place. The bevels at the lower edge of the door and at the upper edge of the subjacent cross piece 21 lock the lower end of the door in place. When it is desired to remove a door, the locking member 24 is turned by its handle 25 so that it clears the doorway-spanning member 15, whereupon the upper end of the door is tilted inward, then the door is slightly raised, and then bodily withdrawn inward from its position. Each door may be removed or replaced independently of the other doors.

I claim as my invention:

1. A silo, composed of vertical staves arranged to leave a vertical opening at one point in the circumference with jambs at the vertical edges of such vertical opening, doorway-spanning members of flat iron having at their ends outwardly directed flanges which bear against adjacent edges of the door jambs, hoops extending from one door jamb around the silo to the other door jamb and attached to said outwardly directed flanges, cross boards fixed in place between the jambs at each doorway-spanning member and recessed to fit over said doorway-spanning members between the flanges thereof, doors fitting in such opening and extending horizontally from one jamb to the other and vertically from one crossboard to another, said doors and said crossboards having their upper and lower edges beveled so that the outer parts of such edges are lower than the inner parts thereof, and releasable fastening means located near the top of each door for coöperating with the adjacent doorway-spanning member to hold the upper end of the door in place.

2. A silo, composed of vertical staves arranged to leave a vertical opening at one point with jambs at the vertical edges of such vertical opening, doorway-spanning members of flat iron having at their ends outwardly directed flanges which bear against the adjacent edges of the door jambs, hoops extending from one door jamb around the silo to the other door jamb and attached to said outwardly directed flanges, doors fitting in such opening and extending from one jamb to the other, and fastening means carried by said doors for engaging said doorway-spanning members for holding the doors in place.

3. A silo, composed of vertical staves arranged to leave a vertical opening at one point with jambs at the vertical edges of such vertical opening, doorway-spanning members of flat iron having at their ends outwardly directed flanges which bear against the adjacent edges of the door jambs, and hoops extending from one door jamb around the silo to the other door jamb and attached to said outwardly directed flanges, and doors fitting in such opening and extending from one jamb to the other, said doors being recessed to fit over said doorway-spanning members.

4. A silo, composed of vertical staves arranged to leave a vertical opening at one point with jambs at the vertical edges of such vertical opening, doorway-spanning members of flat iron having at their ends outwardly directed flanges which bear against the adjacent edges of the door jambs, and hoops extending from one door jamb around the silo to the other door jamb and attached to said outwardly directed flanges, doors fitting in such opening and extending from one jamb to the other, and fastening means carried by said doors for engaging said doorway-spanning members for holding the doors in place, said doors being recessed to fit over said doorway-spanning members.

5. A silo, composed of vertical staves arranged to leave a vertical opening at one point with jambs at the vertical edes of such vertical opening, doorway-spanning members of flat iron having at their ends outwardly directed flanges which bear against the adjacent edges of the door jambs, hoops extending from one door jamb around the silo to the other door jamb and attached to said outwardly directed flanges, doors fitting in such opening and extending from one jamb to the other, said doors at their lower edges being beveled so that the front parts of such lower edges are lower than the rear parts and resting upon correspondingly beveled subjacent pieces, and fastening means located near the top of the doors for coöperating with said doorway-spanning members to fasten the upper ends of the doors in place.

In witness whereof, I have hereunto set my hand at Indianapolis, Indiana, this 30th day of March, A. D. one thousand nine hundred and fifteen.

FRANKLIN GREENWOOD.